(12) United States Patent
Gempper et al.

(10) Patent No.: US 7,568,842 B2
(45) Date of Patent: Aug. 4, 2009

(54) METER BEARING COMPRISING AN INTEGRATED DATA DETECTION AND PROCESSING SYSTEM

(75) Inventors: Sven Gempper, Volkach (DE); Joachim Hering, Wuerzburg (DE); Stefan Glück, Schweinfurt (DE); Alfred Pecher, Stadtlauringen (DE); Jens Heim, Schweinfurt (DE); Timo Schmidt, Sennfeld (DE); Stefan Scharting, Gochsheim (DE); Edgar Streit, Poppenlauer (DE)

(73) Assignee: Schaeffler KG (DE)

( * ) Notice: Subject to any disclaimer, the term of this patent is extended or adjusted under 35 U.S.C. 154(b) by 443 days.

(21) Appl. No.: 10/544,597

(22) PCT Filed: Feb. 4, 2004

(86) PCT No.: PCT/DE2004/000184

§ 371 (c)(1),
(2), (4) Date: May 23, 2006

(87) PCT Pub. No.: WO2004/070337

PCT Pub. Date: Aug. 19, 2004

(65) Prior Publication Data
US 2006/0257060 A1    Nov. 16, 2006

(30) Foreign Application Priority Data

Feb. 5, 2003    (DE) .................... 103 04 592

(51) Int. Cl.
*F16C 32/00*    (2006.01)
*G01L 1/00*    (2006.01)

(52) U.S. Cl. .................... 384/448; 73/862.045

(58) Field of Classification Search .............. 384/448; 73/867.323, 760, 767, 768, 774–776, 581, 73/593, 795, 862.322, 862.045, 862.044, 73/862.541, 862.323
See application file for complete search history.

(56) References Cited

U.S. PATENT DOCUMENTS 4,203,319 A  *  5/1980  Lechler .................. 73/862.541

(Continued)

FOREIGN PATENT DOCUMENTS

DE            197 47 001  A      5/1999

(Continued)

OTHER PUBLICATIONS

International Search Report PCT/DE2004/000184 dated Jun. 10, 2004.

*Primary Examiner*—Thomas R Hannon
(74) *Attorney, Agent, or Firm*—Ostrolenk, Faber, Gerb & Soffen, LLP

(57) ABSTRACT

A meter bearing with a recess located at the periphery of at least one of the bearing rings. Expansion-measuring strips are disposed in the recess and conducting paths and electronic modules are arranged on a supporting material and evaluate and transmit the output signals of the expansion-measuring strips. The expansion-measuring strips are connected to the electrical conducting paths which extend to the electronic modules. In order to reduce the space required for such a measuring and evaluation system in a meter bearing, the expansion-measuring strips are placed below and/or above the radial plane of the supporting material and of the conductor paths and electronic modules located thereupon.

21 Claims, 3 Drawing Sheets

U.S. PATENT DOCUMENTS

| | | | |
|---|---|---|---|
| 5,140,849 A * | 8/1992 | Fujita et al. | 73/593 |
| 5,952,587 A * | 9/1999 | Rhodes et al. | 73/862.541 |
| 6,484,582 B2 * | 11/2002 | Ehrfeld et al. | 73/593 |
| 6,658,943 B2 * | 12/2003 | McDearmon | 73/795 |
| 6,687,623 B2 * | 2/2004 | Bailey et al. | 73/862.541 |
| 6,948,856 B2 * | 9/2005 | Takizawa et al. | 384/448 |

FOREIGN PATENT DOCUMENTS

| | | |
|---|---|---|
| DE | 101 36 438 A | 3/2002 |
| EP | 0 432 122 A | 6/1991 |

* cited by examiner

METER BEARING COMPRISING AN INTEGRATED DATA DETECTION AND PROCESSING SYSTEM

CROSS REFERENCE TO RELATED APPLICATION

The present application is a 35 U.S.C. §§ 371 national phase conversion of PCT/DE2004/000184, filed 4 Feb. 2004, which claims priority of German Application No. 103 04 592.9, filed 5 Feb. 2003. The PCT International Application was published in the German language.

FIELD OF APPLICATION OF THE INVENTION

The invention relates to a measuring bearing with sensors for recording physical variables acting on the bearing and with electronic chips for evaluating and transmitting the sensor output signals and particularly to measuring strips of the bearing.

BACKGROUND TO THE INVENTION

DE 101 36438 A1 discloses a sensor arrangement in a roller bearing which is suitable for ascertaining physical variables during the motion of a component which is guided in the roller bearing. In this sensor arrangement, the forces and moments acting on the bearing rings of the roller bearing are recorded such that the mechanical stresses or other physical influences on the bearing rings can be ascertained using sensor elements and electronic chips integrated in the bearing rings. In this case, the sensors are in the form of expansion measuring strips which are preferably mounted in a groove at the circumference of the stationary bearing ring, the latter being able to be in the form of an inner or outer bearing ring of a roller bearing. In line with this document, the expansion measuring resistors can be mounted via an insulating layer on a metal intermediate support, such as a board. In this case, a further support material, in a form of a circuit carrier, surrounds the intermediate support with the expansion measuring resistors and is used to hold electronic chips and conductor tracks. To mount the circuit camera and the intermediate support with the expansion measuring resistors in the groove in the roller bearing, they are press-fitted into it or welded on. In addition, DE 101 36438 A1 discloses that the expansion measuring resistors can be mounted on the metal intermediate support in an axially and tangentially measuring full or half bridge circuit. In addition, this document discloses that the electronic chips are used for signal evaluation and signal transmission to further measuring points or other evaluation circuits or to a connector. In this case, the signal transmission in this known measuring bearing can take place serially via a digital or analog bus which is arranged in a motor vehicle, for example.

Although this known measuring bearing has a comparatively high and also very advantageous level of integration on account of the arrangement of expansion measuring strips and electronic chips in a cutout in the groove in the bearing ring, a relatively wide groove is required for this design. Hence, the usable area for the sensor is too small or reduced in relation to the width of the groove. Since the groove in such a bearing ring needs to be kept as small as possible, however, in order to avoid weakening components, it is less likely that the arrangement known from DE 101 36 438 A1 will be turned into a commercially viable product. This technical problem also arises with roller bearings which have a very narrow axis, in particular.

OBJECT OF THE INVENTION

Against this background, the object of the invention is to improve a measuring bearing which is known from DE 101 36 438 A1 such that the level of integration of the measuring and evaluation arrangement is increased further in order to be able to accommodate said arrangement in as narrow and space-saving a cutout as possible in one of the bearing rings.

SUMMARY OF THE INVENTION

The invention is accordingly based on a measuring bearing of the generic type in which a cutout at the circumference of one of the bearing rings contains expansion measuring strips. In addition, this cutout contains, on a support material, electrical conductor tracks and electronic chips for evaluating the output signals from the expansion measuring strips and for transmitting intermediate and final results, with the expansion measuring strips being connected to the electronic chips by means of electrical conductor tracks. In accordance with the invention, such a measuring bearing is now developed such that the expansion measuring strips are arranged radially below (outer ring) and/or above the support material (inner ring).

The effect achieved by this design is that the measuring and evaluation system comprising expansion measuring strips, conductor tracks and electronic chips, which is situated in the cutout at the circumference of the bearing ring, is now designed in a plurality of layers and hence requires much less area than the known measuring bearing. For the same width of cutout or groove, it is therefore either possible to accommodate more measuring and evaluation technology in this cutout or only a particularly narrow cutout is required at the circumference of the bearing ring in order to be able to accommodate a particular measuring and evaluation system, or the depth of the groove can be in particularly shallow form. Another advantage is that the total groove width can be used for the DMS measuring strips, and hence the deformations can be recorded better.

In such a measuring roller bearing, said measuring and evaluation system is produced in a circumferential cutout preferably on the stationary bearing ring. When the measuring and evaluation system is arranged on the rotating bearing ring, it is necessary to use the ordinarily known systems (telemetry, inductive coupling, loop contacts) for transmitting data and power.

In one particularly advantageous development of the invention, the measuring and evaluation system has the expansion measuring strips applied directly to the surface of at least one the bearing rings. This application of the expansion measuring strips to the surface of a bearing ring in the region of its circumferential cutout is preferably achieved through sputtering. Although the formation of surface structures on planar bodies by vapor deposition of, preferably, conductors or semiconductors under vacuum is known per se, a new process which is not easy to master from a technical point of view is the sputtering of, by way of example, thin-layer expansion measuring strips onto a curved surface, such as the circumferential cutout in a bearing ring.

As experiments have shown, such structures can be produced with a high level of success using suitable process engineering. Thus, by way of example, provision may be made for the expansion measuring strips to be applied directly to the surface of the bearing ring in the case of a bearing ring made of an electrically nonconductive or only poorly conductive material (e.g. plastic), or to be applied to an interposed silicon dioxide layer in the case of a bearing ring made of an electrically conductive material.

For the purpose of electrically connecting the expansion measuring strips to at least one of the conductor tracks and/or directly to the electronic chips, a further useful refinement of the invention has provision for connecting wires (bonding wires) which penetrate cutouts in the support material for the electronic chips. This support material is preferably in the form of a flexible plastic film.

To protect the measuring and evaluation system arranged in the circumferential cutout in the bearing ring against external mechanical and/or soiling influences, another refinement of the invention has provision for the cutouts in the support material and/or for all chips arranged in the cutout at the circumference of the bearing ring to be covered by a flexible and electrically nonconductive covering material. This covering material is preferably in the form of an organic plastic potting compound which can be used to cover the coverage zones quickly and cleanly.

In another preferred refinement of the measuring bearing, provision is made for its electrical and electronic chips to be designed for ascertaining the speed of rotation and/or the direction of rotation of a body mounted in the bearing, the radial and axial forces acting on the bearing, the direction of force, the bearing noise, the bearing temperature and any imbalance which may arise.

The electronic chips may be designed to be individual discrete electronic chips such as operational amplifiers, capacitors, resistors or else to be complex and very small microcomputers. In addition, for particular instances of application it is regarded as appropriate when a plurality of microcomputers are arranged in the circumferential cutout in the bearing ring and are connected by means of data lines via which digital data interchange can take place.

It is also advantageous when at least one of the electronic chips has a connecting point via which raw data and/or conditioned information about the current physical state of the bearing and/or of the component connected to the bearing can be routed to at least one separate display, data-storage and/or data-processing device situated outside of the bearing.

Finally, provision may be made for an adhesive to be applied between the silicon dioxide layer on the circumferential groove in the bearing ring and the expansion measuring strips and/or the conductor tracks and to serve as a bonding means between the surface coated with silicon dioxide and precisely these electrical components.

BRIEF DESCRIPTION OF THE DRAWINGS

The invention can be explained with reference to specific exemplary embodiments which are shown in the appended drawing, in which.

DETAILED DESCRIPTION OF THE DRAWINGS

Figure 1:
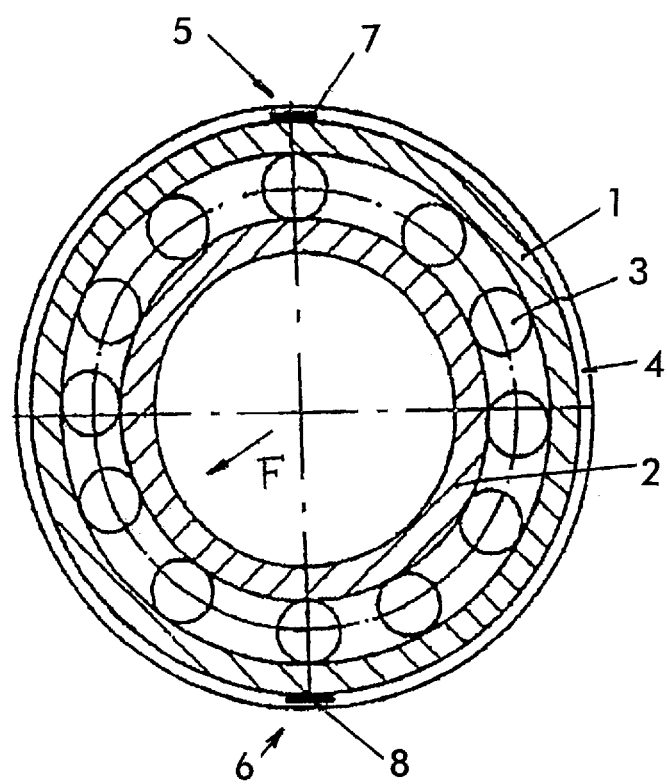
FIG. 1 shows a schematic cross section through a roller bearing.
Figure 2:
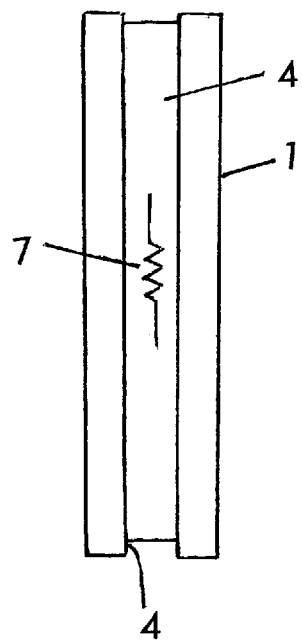
FIG. 2 shows a plan view of a circumferential groove in the roller bearing shown in FIG. 1.
Figure 3:
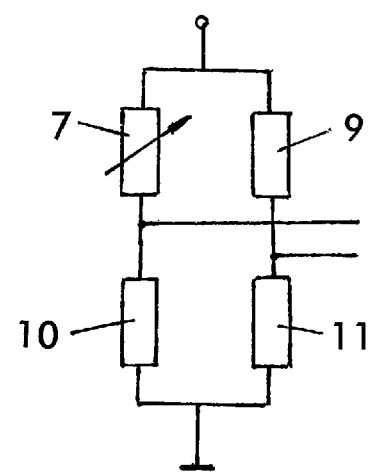
FIG. 3 shows an electrical measuring bridge circuit.
Figure 4:
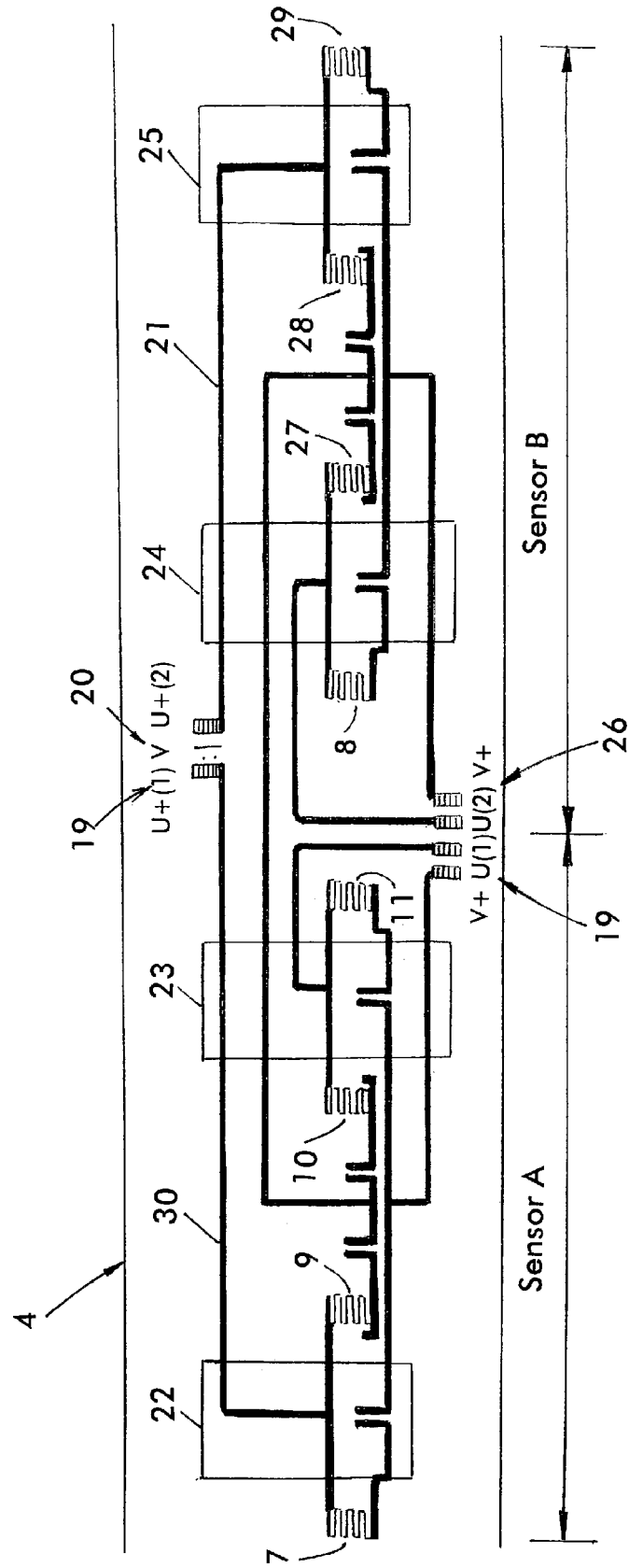
FIG. 4 shows a plan view of two thin-layer expansion measuring sensors in bridge circuits which are arranged in a circumferential groove in a bearing ring.

Accordingly, FIG. 1 uses a coarse overview to show a cross section through a measuring roller bearing which essentially comprises an outer ring 1, an inner ring 2 and rolling bodies 3 arranged between these two bearing rings 2, 3. In addition, FIG. 1 and also FIG. 2, with its plan view of the circumferential area of the outer ring 1, show that the outer circumference of the outer ring 1 has an annular groove 4 in which sensors 7, 8 for recording a force F, for example, are arranged at measuring points 5, 6. In this case, the groove in the outer ring 1 need not necessarily be in the form of a circumferential groove, since said sensors 7, 8 can also be mounted in axially oriented grooves at the circumference of one of the two bearing rings 1, 2. As FIG. 2 indicates and FIGS. 3 and 4 show, the sensors 7, 8 are in the form of expansion measuring strips and are connected to one another using other electrical resistors 9, 10, 11, 27, 28, 29 in at least one measuring bridge. In this case, these expansion measuring strips each have a variable electrical resistance which, when the rolling body 3 rolls past, responds to a pressure loading at the force F on the outer ring 1 with a change of resistance which can be picked off as a measured signal on the measuring bridge. The figure does not show the use of two variable resistors 7 and 11.

Whereas, in the case of the known measuring bearing, the individual expansion measuring strips and the electronic chips immediately adjacent thereto are arranged in the same radial plane in the cutout in a bearing ring, a measuring bearing based on the invention is provided by virtue of the expansion measuring strips being mounted in a radial plane on the bearing ring which is different than the radial plane of the electronic chips and conductor tracks of the flexible film. This different radial plane for the expansion measuring strips is arranged below the radial plane of the electronic chips and the conductor tracks in the exemplary embodiment illustrated here, which means that the area requirement for this large-scale-integrated measuring and evaluation system is significantly reduced. This design will be discussed in more detail later.

FIG. 4 uses a developed view of the circumferential groove 4 in the outer bearing ring 1 to show, first of all, how the expansion measuring strips 7, 9, 10, 11 of a first sensor A and expansion measuring strips 8, 27, 28, 29 of a second sensor B are arranged in a row in succession in the region of the trajectory of the roller bearings 22, 23, 24, 25. In this exemplary embodiment, these expansion measuring strips are sputtered onto a silicon dioxide coated surface of the circumferential groove in the outer bearing ring and hence are in the form of thin-layer sensors.

As can clearly be seen from this depiction, the expansion measuring strips 7, 9, 10, 11 and the expansion measuring strips 8, 27, 28, 29 of the two sensors A, B are each connected to one another by means of likewise sputtered conductor tracks 21, 30 to form measuring bridges whose measured signals modulated by the passing rolling bodies 22, 23, 24, 25 can be picked off at contact points 20, 26. In addition, contact points 19 for the power supply for the expansion measuring strips 7, 9, 10, 11 and 8, 27, 28, 29 are also sputtered on in the region of these measured signal contact points 20, 26.

In line with the central concept of the invention, all other electrical conductor tracks and electronic chips associated with this roller bearing's measuring and evaluation device are arranged radially above these thin-layer expansion measuring strips in another radial plane with reference to the bearing ring 1.

Figure 5:
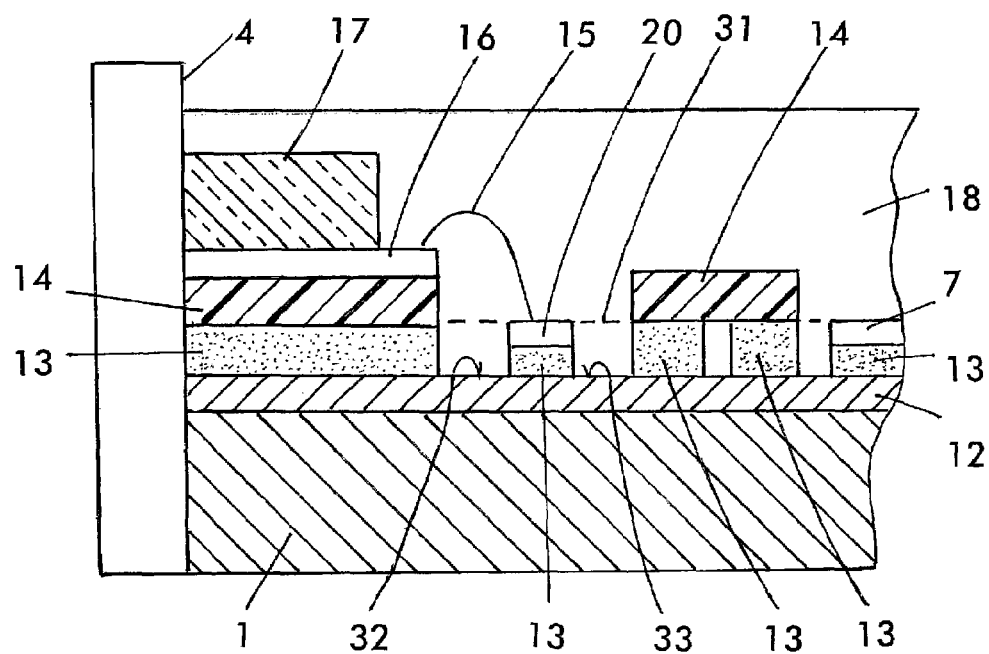
FIG. 5 shows a schematic cross section through the outer ring of the bearing shown in FIG. 1 in the region of the measuring and evaluation system.

As shown by the highly simplified cross-sectional illustration of the overall design of the measuring and evaluation system in this outer bearing ring 1 in FIG. 5, the bottom of the circumferential groove 4 in the bearing ring 1 first of all has an insulating layer 12 (e.g. $Al_2O_3$ or silicon dioxide layer) on it which serves as an electrical insulating layer for the electrical components arranged above.

This insulating layer 12 has an adhesive 13 on it which carries a flexible support material 14 on which the electrical conductor tracks 16 and the electronic chips 17 (such as microcomputers) are preferably likewise bonded or else sputtered so as to point radially outward. Below the radial plane 31 of the support material 14 for the conductor tracks 16 and the electronic chips 17, the expansion measuring strips 7, 9, 10, 11 and 8, 27, 28, 29 together with their conductor tracks 21, 30 and contact points 19, 20, 26 are arranged, but of these only an initially cut expansion measuring strip 7 and the contact point 20 are shown here.

To connect the sensors or measuring bridges A, B which contain the expansion measuring strips to the conductor tracks 16 or electronic chips 17 which are arranged one radial plane higher, the connecting points 19, 20, 26 of the sensors A, B are not covered by the support material 14 in the region of cutouts 32, 33, so that connecting wires (bonding wires) 15 provide electrical connections between said components. In this case, these connecting wires 15 are preferably in the form of metal threads which have contact made with them by means of a laser beam or which are liquid and which are drawn from one contact point to the next contact point.

Arranged above all of said chips in this exemplary embodiment there is a covering material 18 which ensures reliable mechanical and electrical protection of the support film 14 and of the electrical and electronic components in a flexible and electrically insulating manner.

The inventive measuring bearing is distinguished by a design which saves a large amount of area, which means that it is also possible to fit corresponding measuring and evaluation systems into roller bearings of very narrow design which were previously not able to be implemented as measuring bearings. In addition, a bearing with the measuring and evaluation system constructed in radial layers can be accommodated in a very narrow circumferential groove, so that component weakening is reduced to the lowest possible level. Thin-layer design and flat-construction measures (thinned ASICs) largely reduce the depth of the groove and hence the component weakening.

The invention claimed is:

1. A measuring bearing comprising:
   an inner ring, an outer ring positioned outwardly of the inner ring, and rolling elements located between the rings, each ring having a respective circumference;
   a cutout at the circumference of at least one of the bearing rings;
   expansion measuring strips arranged in the cutout;
   conductor tracks connected with the strips and being arranged on a support material; and
   electronic chips situated on the support material and being operable for evaluating and transmitting output signals from the expansion measuring strips, the expansion measuring strips being electrically connected to the electrical conductor tracks and routed to the electronic chips,
   the expansion measuring strips being arranged radially below or radially above radial planes of the support material, the conductor tracks and the electronic chips.

2. The measuring bearing as claimed in claim 1, wherein the at least one bearing ring has a surface at the circumference thereof and the surface has an insulating layer at least in a region of the cutout.

3. The measuring bearing as claimed in claim 2, further comprising an adhesive applied to the insulating layer on the bearing ring, the adhesive being positioned and configured to support at least one of the expansion measuring strips, the support material and electrical conductors.

4. The measuring bearing as claimed in claim 2, wherein the insulating layer is a silicone dioxide layer.

5. The measuring bearing as claimed in claim 4, wherein at least one of the expansion measuring strips, the electrical conductor tracks and the electronic chips is sputtered directly onto the silicon dioxide layer.

6. The measuring bearing as claimed in claim 1, wherein at least one of the expansion measuring strips, the electrical conductor tracks and the electronic chips are sputtered directly onto a surface of the cutout in the at least one bearing ring.

7. The measuring bearing as claimed in claim 1, further comprising connecting wires connecting the expansion measuring strips to the conductor tracks or to the electronic chips directly.

8. The measuring bearing as claimed in claim 7, further comprising second cutouts in the support material in a region of the connecting wires.

9. The measuring bearing as claimed in claim 8, wherein the cutouts in the bearing ring are covered by a flexible and electrically nonconductive covering material.

10. The measuring bearing as claimed in claim 9, wherein the covering material comprises a plastic organic potting compound.

11. The measuring bearing as claimed in claim 8, wherein at least one of the cutouts and the second cutout in the bearing ring are covered by a flexible and electrically nonconductive covering material.

12. The measuring bearing as claimed in claim 1, wherein the support material is flexible.

13. The measuring bearing as claimed in claim 12, wherein the support material comprises a plastic film.

14. The measuring bearing as claimed in claim 1, wherein the bearing comprises a roller bearing and the bearing rings are comprised of a metal or a plastic.

15. The measuring bearing as claimed in claim 14, wherein one of the rings is a stationary ring relative to the other ring and the cutout is on the stationary bearing ring.

16. The measuring bearing as claimed in claim 15, wherein the outer ring is the stationary ring.

17. The measuring bearing as claimed in claim 1, wherein the electronic chips are operable for ascertaining at least one of the speed of rotation and the direction of rotation of a body mounted in the bearing, radial and axial forces acting on the bearing, a direction of a force a bearing noise, bearing temperature and any imbalance which may arise.

18. The measuring bearing as claimed in claim 17, wherein the electronic chips comprise at least one microcomputer.

19. The measuring bearing as claimed in claim 18, further comprising a plurality of microcomputers, data lines connecting the microcomputers to one another and the data lines being operable for digital data interchange.

20. The measuring bearing as claimed in claim 17, wherein at least one of the electronic chips has a connecting point operable such that at least one of raw data and conditioned information about at least one of a current physical state of the bearing and of the component connected to the bearing can be routed to at least one of a separate display, data-storage and a data-processing device situated outside of the bearing.

21. The measuring bearing as claimed in claim 1, wherein one of the rings is a stationary ring relative to the other ring and the cutout is on the stationary bearing ring.

* * * * *